US009886262B2

(12) United States Patent
Thomas et al.

(10) Patent No.: US 9,886,262 B2
(45) Date of Patent: Feb. 6, 2018

(54) ADAPTIVE UPGRADE TO COMPUTING SYSTEMS

(71) Applicant: Microsoft Technology Licensing, LLC, Redmond, WA (US)

(72) Inventors: Satish J. Thomas, Sammamish, WA (US); Tomasz K. Kaminski, Issaquah, WA (US); Andrew William Jewsbury, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 53 days.

(21) Appl. No.: 15/052,058

(22) Filed: Feb. 24, 2016

(65) Prior Publication Data
US 2016/0274893 A1 Sep. 22, 2016

Related U.S. Application Data

(60) Provisional application No. 62/133,903, filed on Mar. 16, 2015.

(51) Int. Cl.
G06F 9/44 (2006.01)
G06F 9/445 (2006.01)

(52) U.S. Cl.
CPC .......... *G06F 8/65* (2013.01); *G06F 8/61* (2013.01); *G06F 8/71* (2013.01); *G06F 9/44505* (2013.01); *G06F 9/44536* (2013.01)

(58) Field of Classification Search
None
See application file for complete search history.

(56) References Cited

U.S. PATENT DOCUMENTS

| 7,107,224 | B1 | 9/2006 | Weller et al. |
| 7,191,435 | B2 | 3/2007 | Lau et al. |
| 7,752,055 | B1 | 7/2010 | Partezana |
| 7,840,461 | B2 | 11/2010 | Raguseo et al. |
| 8,006,223 | B2 | 8/2011 | Boulineau et al. |
| 8,731,991 | B2 | 5/2014 | Altuwaijri et al. |
| 2004/0204972 | A1 | 10/2004 | Anant et al. |
| 2005/0216890 | A1 | 9/2005 | Sundararajan et al. |
| 2006/0080656 | A1* | 4/2006 | Cain ......................... G06F 8/65 717/174 |
| 2008/0071589 | A1 | 3/2008 | Laicher |
| 2009/0307670 | A1* | 12/2009 | Kashyap ................... G06F 8/20 717/135 |

(Continued)

OTHER PUBLICATIONS

International Search Report and Written Opinion for International Patent Application No. PCT/US2016/021968, dated: Jun. 17, 2016, date of filing: Mar. 11, 2016, 16 pages.
Wu Zhou et al: "Always Up-to-date-Scalable Offline Patching of VM Images in a Compute Cloud", Proceedings of the 26th Annual Computer Security Applications Conference on, ACSAC '10, Dec. 6, 2010, 10 pages.

(Continued)

*Primary Examiner* — Wei Zhen
*Assistant Examiner* — Binh Luu
(74) *Attorney, Agent, or Firm* — Christopher J. Volkmann; Kelly, Holt & Chirstenson PLLC

(57) ABSTRACT

An upgrade or update that is available to a deployed computing system (or deployment) under analysis is identified. Performance improvement metrics measured at similar deployments, that incorporated the identified update, are accessed to estimate a performance improvement metric corresponding to incorporating the identified update at the deployment under analysis.

20 Claims, 10 Drawing Sheets

(56) References Cited

U.S. PATENT DOCUMENTS

| | | | |
|---|---|---|---|
| 2010/0058313 A1* | 3/2010 | Hansmann | G06F 8/68 717/168 |
| 2010/0251204 A1 | 9/2010 | Peterson et al. | |
| 2011/0112986 A1 | 5/2011 | Flinn et al. | |
| 2011/0225575 A1* | 9/2011 | Ningombam | G06F 8/65 717/170 |
| 2012/0137278 A1* | 5/2012 | Draper | G06F 8/65 717/170 |
| 2014/0081652 A1 | 3/2014 | Klindworth | |
| 2015/0020061 A1* | 1/2015 | Ravi | G06F 8/65 717/172 |
| 2015/0058822 A1* | 2/2015 | Elias | G06F 8/71 717/123 |
| 2015/0248484 A1* | 9/2015 | Yu | G06F 17/30867 707/711 |
| 2016/0034305 A1* | 2/2016 | Shear | G06F 9/50 707/722 |

OTHER PUBLICATIONS

Fan Kang et al: "OPS: Offline Patching Scheme for the Images Management in a Secure Cloud Environment", 2013 IEEE International Conference on Services Computing, IEEE, Jun. 28, 2013, 8 pages.

Tariq M. King et al: "Migrating Autonomic Self-Testing to the Cloud", Software Testing, Verification, and Validation Workshops (ICSTW), 2010 Third International Conference on, IEEE, Apr. 6, 2010, 6 pages.

Li, et al., "Improving the ROI of Software Quality Assurance Activities: An Empirical Study", In Proceedings of the international conference on New modeling concepts for today's software processes: software process, Jul. 8, 2010 2 pages.

Auer, et al., "Increasing the Accuracy and Reliability of Analogy-Based Cost Estimation with Extensive Project Feature Dimension Weighting", In Proceedings of the International Symposium on Empirical Software Engineering, Aug. 19, 2004, 9 pages.

* cited by examiner

ADAPTIVE UPGRADE TO COMPUTING SYSTEMS

CROSS-REFERENCE TO RELATED APPLICATION

The present application is based on and claims the benefit of U.S. provisional patent application Ser. No. 62/133,903, filed Mar. 16, 2015, the content of which is hereby incorporated by reference in its entirety.

BACKGROUND

Computer systems are currently in wide use. Some computer systems have a base system that is originally manufactured by a software manufacturer. The base system is then customized (and often heavily customized) prior to being deployed at an end user organization.

By way of example, customer relations management and enterprise resource planning systems are often very large applications. They can include many thousands of user interface displays (or forms) each having hundreds of different controls. It is not uncommon for a system to first be modified by a value added reseller or independent software vendor to obtain a first customized version of the base system. The first customized version may then be further customized by developers when the system is actually deployed into an end user organization.

In such scenarios, it is also common for the software manufacturer to release subsequent updates or upgrades to the base version. Deciding whether to incorporate such updates or upgrades, at an end user deployment, can be a very difficult decision. It can be difficult to know how the upgrade or update will impact the end user deployment, the effort that will be needed in order to perform the upgrade or update, and whether the upgrade or update will increase the performance of the end user deployment sufficiently to justify that effort.

The discussion above is merely provided for general background information and is not intended to be used as an aid in determining the scope of the claimed subject matter.

SUMMARY

An upgrade or update that is available to a deployed computing system (or deployment) under analysis is identified. Performance improvement metrics measured at similar deployments, that incorporated the identified update, are accessed to estimate a performance improvement metric corresponding to incorporating the identified update at the deployment under analysis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
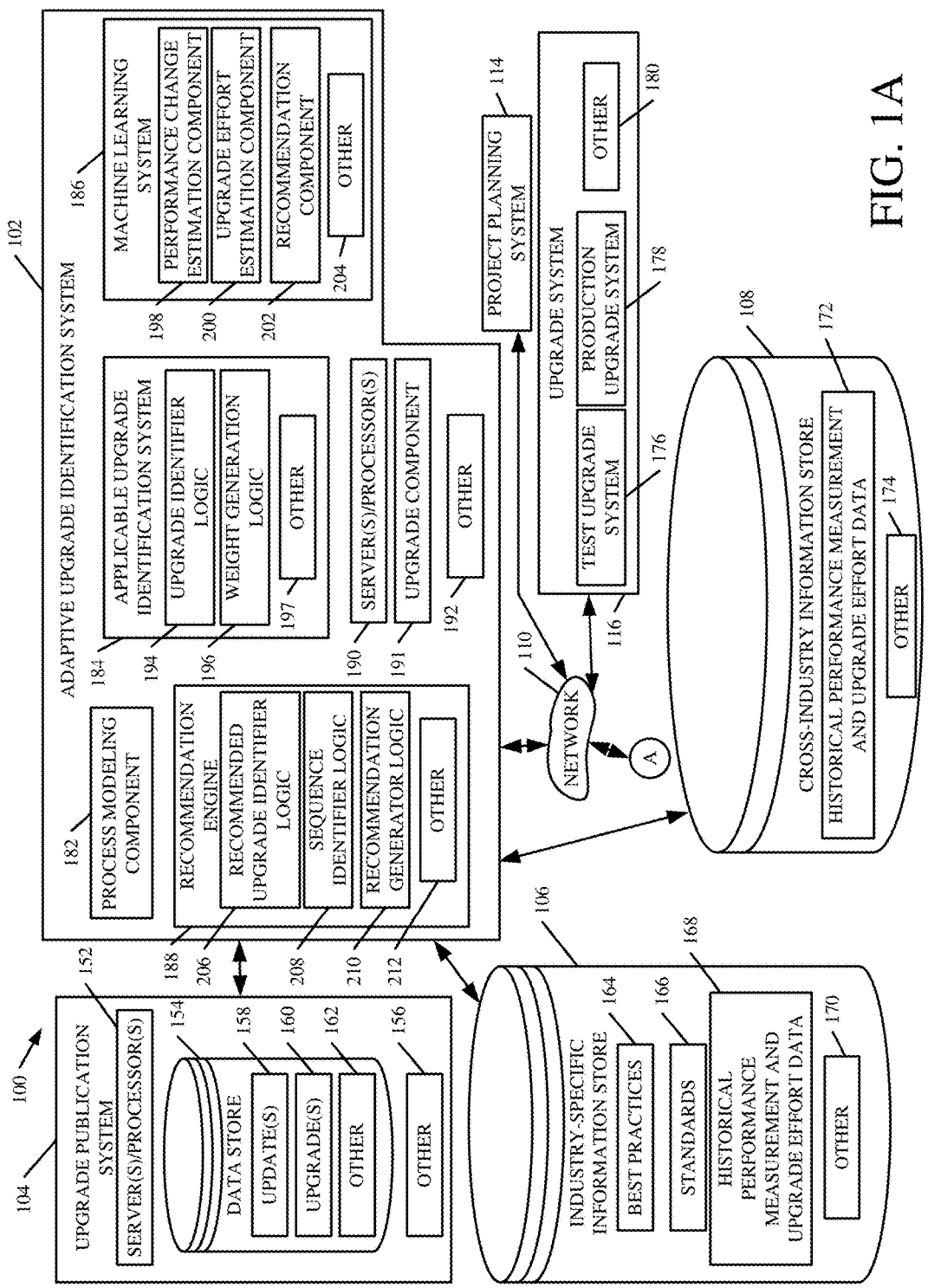
FIGS. 1A and 1B (collectively referred to herein as FIG. 1) show a block diagram of one example of an adaptive upgrade architecture.
Figure 1B:
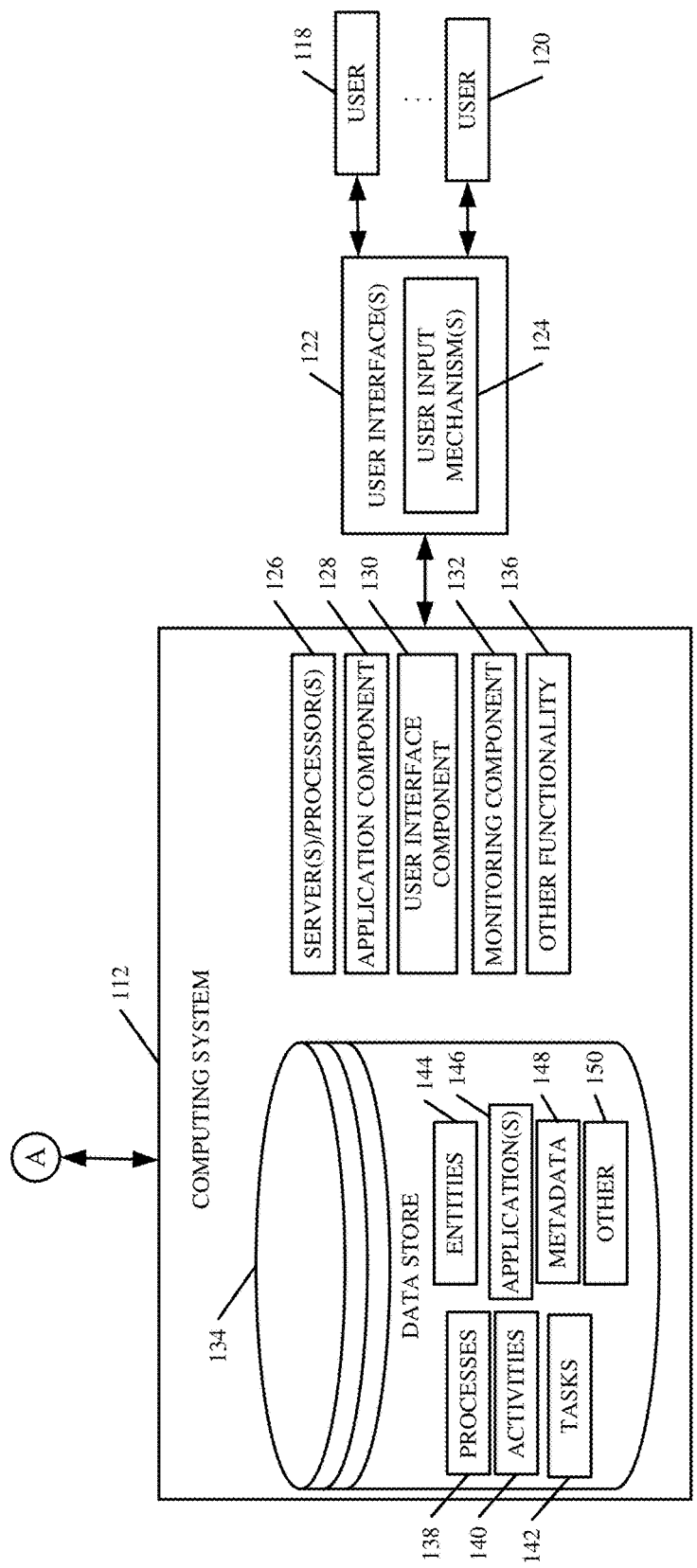

FIGS. 1A and 1B (collectively referred to herein as FIG. 1) show a block diagram of one example of an adaptive upgrade architecture 100. Architecture 100 illustratively includes adaptive upgrade identification system 102 that accesses update publication system 104 and industry-specific information store 106 and cross-industry information store 108. Architecture 100 also shows that system 102 is illustratively coupled, over network 110, to a computing system 112 that is being analyzed to determine whether upgrades or updates (collectively referred to herein as upgrades) are available, and whether they should be incorporated into system 112. The example shown in FIG. 1 also illustrates that project planning system 114 and upgrade system 116, are also accessible over network 110.

Before describing the operation of architecture 100 in more detail, a brief overview of its operation will first be provided, and then a discussion of some of the individual items in architecture 100 will first be provided as well. Briefly, it is assumed that computing system 112 has one or more deployed processes, that are being used by users 118-120. System 112 can, for instance, generate user interfaces 122, with user input mechanisms 124, for interaction by users 118-120. Users 118-120 illustratively interact with user input mechanisms 124 in order to control and manipulate computing system 112. Computing system 112 can be, for example, an enterprise resource planning system, a customer relations management system, a line-of-business system, a document management system, etc.

At some point, a manufacturer of the processes being run by system 112 may release an upgrade for them. In that case, adaptive upgrade identification system 102 illustratively models the processes that are deployed on computing system 112, as well as the usage patterns that are performed by users 118-120 of system 112. It then accesses update system 104 to identify any available updates, and it determines how those updates will impact the processes deployed on system 112, given the usage patterns of users 118-120. It then accesses information stores 106-108 to identify similar organizations (similar to the deployment under analysis in computing system 112) that have incorporated one or more of the identified updates, and accesses information indicating how performance metrics for those organizations changed (such as improved or degraded) based upon the incorporated updates. System 102 then generates an estimation corresponding to computing system 112 that indicates the estimated effort (such as hours, cost, downtime, etc.) that will be needed to incorporate the identified updates, and one or more performance change metrics that indicate how the performance of computing system 112 will change, if the computing system is upgraded.

System 102 can also access project planning system 114 to generate a customized project plan for incorporating the updates, and for identifying a sequence of that incorporation, and further providing a recommendation to computing system 112, indicative of the updates that should be incorporated, the sequence of the updates, and how those updates will change the performance of system 112. The recommendation can also indicate how that performance change is quantified, relative to the effort that will be needed to incorporate the updates. If a user of system 112 indicates that the updates are to be incorporated, then system 102 can automatically invoke upgrade system 116 to perform the recommended upgrades on computing system 112. System 102 then monitors the performance of computing system 112, after the upgrades are incorporated, to measure the actual effort needed to incorporate the updates and to measure the actual performance change of system 112, once the updates have been incorporated. This information can be fed back and used to fine tune estimates for other computing systems, in the future.

Some of the specific items in architecture 100 will now be described, and this will be followed by a more detailed description of the operation of architecture 100. In the example shown in FIG. 1, computing system 112 includes one or more servers or processors 126, application component 128, user interface component 130, monitoring component 132, data store 134, and it can include a wide variety of other functionality 136. Data store 134 can illustratively store one or more processes 138, activities 140, tasks 142, entities 144, applications 146, and all of these can be described or defined using metadata 148. Data store 134 can include a wide variety of other data records or items 150, as well.

Application component 128 illustratively runs one or more applications 146 to perform one or more processes 138. The processes 138 can include activities 140 and tasks 142 that may be performed automatically, or by users 118-120. The processes, activities and tasks can be used to operate on data records stored in data store 134. The data records can be stored as entities (which can be objects that can expose interfaces for invoking methods) or as other data records. Monitoring system 132 illustratively monitors the performance of computing system 112 and can also monitor the usage patterns of users 118-120 and the various processes 138 that are being used by application component 128 on computing system 112. This information can be provided by monitoring component 132 to adaptive upgrade identification system 102, or other systems in architecture 100.

Update publication system 104 illustratively includes one or more servers or processors 152, data store 154, and it can include other items 156. Data store 154 can include updates 158 or upgrades 160 that are available for the applications 146 or processes 138, etc., run by computing system 112. For the purposes of the present discussion, updates 158 and upgrades 160 will be collectively referred to as upgrades. Data store 154 can include other items 162 as well.

Industry-specific information store 106 can include a set of industry-specific best practices 164 and industry-specific standards 166. Best practices 164 and standards 166 may, for instance, be industry-specific information that is related to the industry in which computing system 112 is deployed. For instance, it may be that an industry standard or best practice specifies that the industry should use "lean manufacturing" or other best practices or standards. This is an example only, and there may be a wide variety of other industry-specific standards or best practices that can be provided in information store 106.

In one example, information store 106 also includes historical performance measurement and effort data 168, and it can include other items 170. Data 168 may be indicative of the changes in one or more different performance metrics for other organizations or computing systems, in the same or similar industry as computing system 112, that incorporated the available upgrades. For instance, the performance metrics may include such things as manufacturing efficiency, raw materials waste, warranty costs, reliability, or any of a wide variety of other metrics. The historical performance measurement data 168 may be indicative of how measured values for those metrics changed in the similar organizations, after they made the available upgrades.

Data 168 can also be indicative of the upgrade effort that was needed to perform the upgrades on the similar deployments. For instance, the upgrade effort data may indicate the number of man hours, the cost, the downtime, the different roles of individuals used to perform the upgrades, or a wide variety of other information relative to the effort needed to perform the upgrades.

Cross-industry information store 108 may illustratively include similar historical performance and effort measurement data 172, but for organizations that are in different industries than the industry in which computing system 112 is deployed. It can include a wide variety of other information 174 as well.

Upgrade system 116 illustratively includes test system 176, production upgrade system 178, and it can include other items 180. Test upgrade system 176 illustratively provisions a test environment where any selected upgrades can be incorporated into a computing system, and tested. Production upgrade system 178 illustratively performs the upgrades in a production environment. In one example, system 102 can invoke upgrade system 116 to have it upgrade a system in the test environment and in the production environment. This is described in greater detail below.

Adaptive upgrade identification system 102 illustratively includes process modeling component 182, applicable upgrade identification system 184, machine learning system 186, recommendation engine 188, one or more servers or processors 190, upgrade component 191 and it can include a wide variety of other items 192. Process modeling component 182 illustratively interacts with monitoring component 132 on computing system 112. In doing so, it can illustratively identify the various processes 138 being run by application component 128 on computing system 112. It also illustratively identifies the usage patterns of users 118-120 in using those processes. The usage patterns may indicate, for instance, which forms or controls are used in a given process, the data records affected, the frequency of use of various processes, tasks, forms, etc. the roles of individuals using the processes, tasks, forms etc., among a wide variety of other things. Process modeling component 182 can also illustratively generate a model of the processes and usage patterns thus deployed and used at computing system 112.

Applicable upgrade identification system 184 can include upgrade identifier logic 194, weight generation logic 196, and it can include other items 197. Upgrade identifier logic 194 illustratively obtains an indication of the various processes being run on computing system 112, from process modeling component 182. It accesses upgrade publication system 104 to identify various upgrades that are available to the processes being run on system 112.

Weight generation logic 196 generates a weight corresponding to each of the identified upgrades. The weight may be indicative of the impact that a given upgrade will have on the processes being run by computing system 112 and based on the usage patterns identified. For instance, one upgrade may have a significant impact on one or more heavily used processes, while another upgrade has a relatively small impact on only a single, lightly used, process. These considerations can be used by logic 196 in generating a weight associated with each of the identified upgrades.

Machine learning system 186 can include performance change estimation component 198, upgrade effort estimation component 200, recommendation component 202, and it can include other items 204. Components 198-200 are illustratively machine learning systems or algorithms that can be used in identifying and recommending various upgrades for computing system 112. Performance change estimation component 198 illustratively accesses the historical performance measurement data in data stores 106 and 108 and estimates the change in performance metrics for computing system 112 if system 112 were to incorporate the various upgrades identified by applicable upgrade identification system 184. Upgrade effort estimation component 200 illustratively accesses the information in data stores 106 and 108 and generates an estimation of the effort (such as in units of time, currency, man hours per role, etc.) that will be needed to incorporate the identified updates into computing system 112. Recommendation component 202 can be used by recommendation engine 188 in order to compare the change in performance metrics to the effort involved in incorporating any upgrades, to generate a recommendation of which particular upgrades should be incorporated by computing system 112. This can be done based upon the performance change estimation and the upgrade effort estimation generated by components 198 and 200, respectively.

Recommendation engine 188 can illustratively include recommended upgrade identifier logic 206, sequence identifier logic 208, recommendation generator logic 210, and it can include other items 212. Recommended upgrade identifier logic 206 illustratively obtains the change in performance metrics estimated by component 198 and the upgrade effort information estimated by component 220, and any recommendation generated by component 202 and identifies the particular upgrades that should be recommended for incorporation into system 112. For instance, it may be that a given upgrade will increase a given performance metric by a certain amount, and that will outweigh the estimated effort that is required to make that upgrade in system 112. In that case, the given upgrade may be recommended. However, there may be another upgrade in which the estimated effort needed to incorporate it into computing system 112 outweighs the increase in one or more performance metrics in system 112. In that case, the recommendation may not be identified as one that is to be recommended.

In addition, the sequence of incorporating the recommended upgrades may be identified by sequence identifier logic 208. For instance, it may be that the deployment in computing system 112 is at a certain size (e.g., number of users, quantity of computing resources, etc.), but system 112 (or user 118-120) has indicated that it intends to grow the deployment at a given rate over the next five years. Thus, it may be that the estimated change in performance metrics may not be sufficient to justify an upgrade, presently, but in three years that upgrade may be justified, based upon the estimated growth of the deployment in computing system 112. Thus, sequence identifier logic 208 can identify a sequence of upgrades, and a timing for incorporation of those upgrades.

Recommendation generator logic 210 can use the identified upgrades and the sequence for those upgrades generated by logic 206 and 208, respectively. It can include the estimated change in the performance metric generated by component 198 and the estimated upgrade effort estimated by component 200. It can incorporate all of that information into an upgrade recommendation that can be provided to a decision maker for computing system 112.

Recommendation engine 188 can also access project planning system 114 to generate a project plan for incorporating the recommended upgrades into system 112. Recommendation generator logic 210 can include that project plan, in the generated recommendation.

If any of the recommendations are selected by the decision maker for computing system 112, this can be provided to upgrade component 191 in system 102. Upgrade component 191 can then access upgrade system 116 and provision a test environment where an upgraded computing system (representing an upgraded test version of the deployment in computing system 112) can be launched and tested. It can access production upgrade system 178 which incorporates the upgrades into the production environment of computing system 112, after the upgrades have been successfully incorporated and tested in the test environment.

Figure 2A:
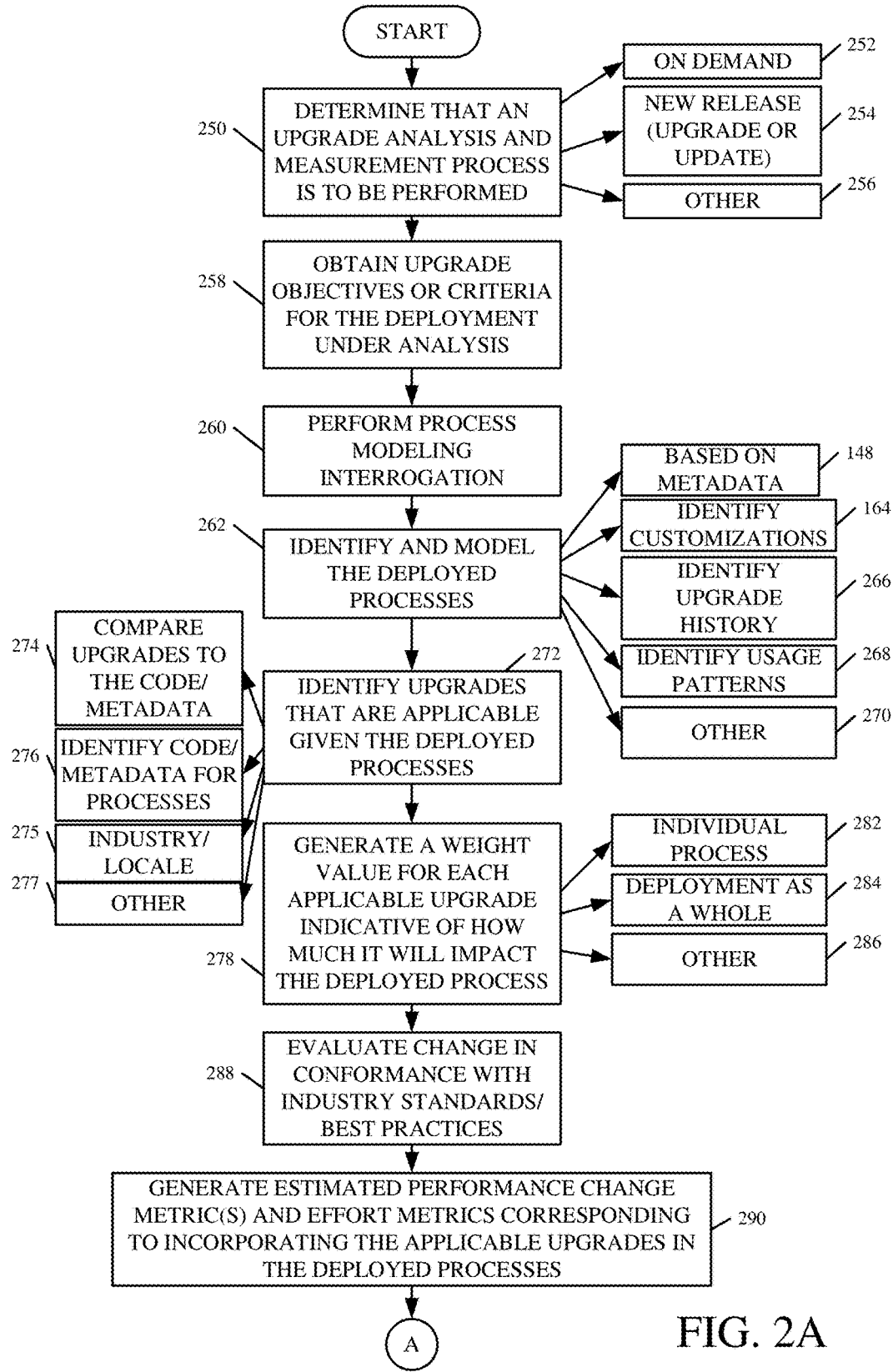
FIGS. 2A and 2B (collectively referred to herein as FIG. 2) show a flow diagram illustrating one example of the operation of the architecture shown in FIG. 1 in identifying and incorporating updates, into a deployed computing system.
Figure 2B:
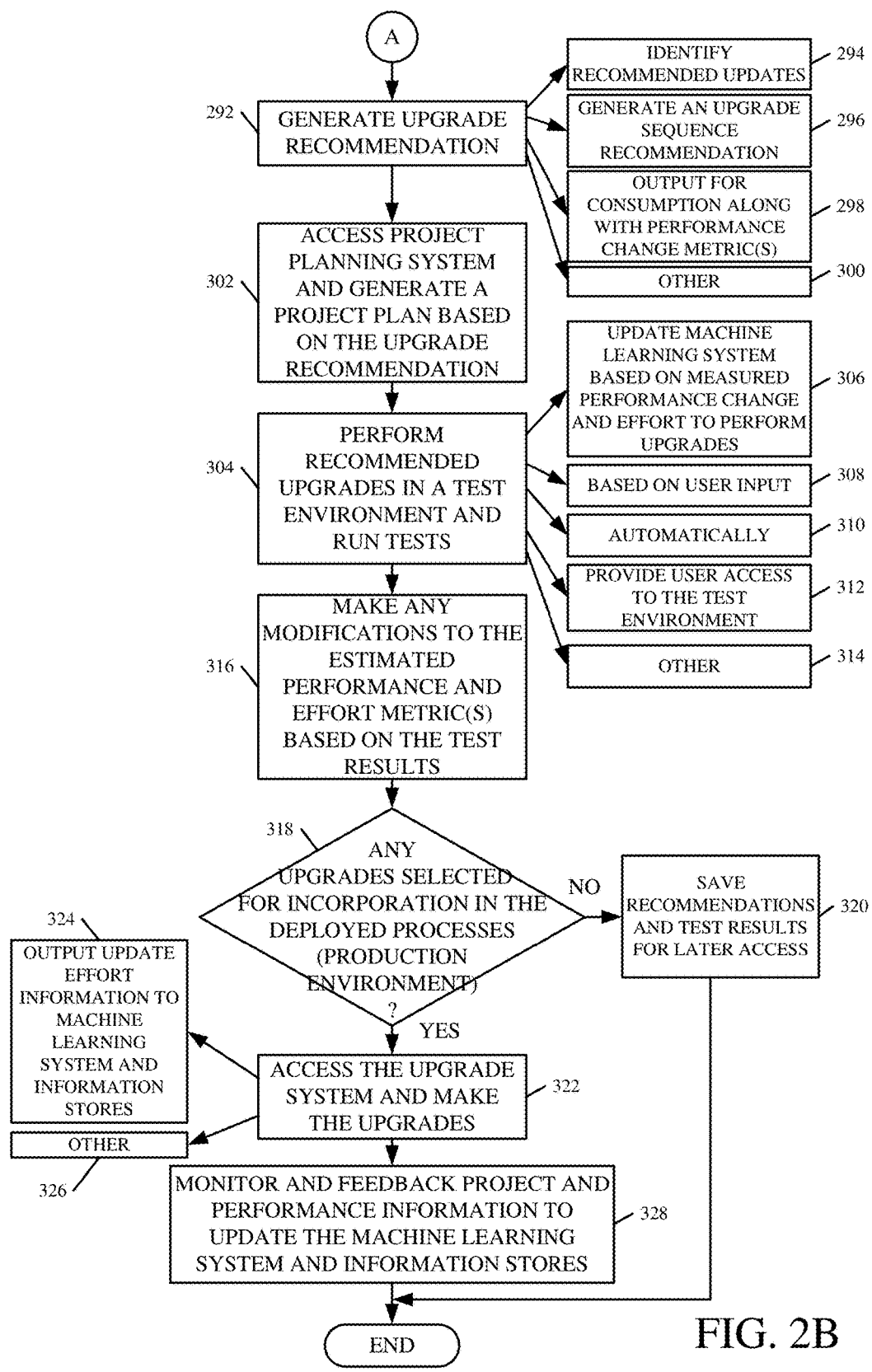

FIGS. 2A and 2B (collectively referred to herein as FIG. 2) show a flow diagram of one example of the operation of architecture 100 in identifying and recommending applicable upgrades for computing system 112, and in incorporating those upgrades into computing system 112. It is first determined that an upgrade analysis and measurement process are to be performed relative to computing system 112. This is indicated by block 250 in the flow diagram of FIG. 2. This can be done in a variety of different ways. For instance, it may be that a user provides a user input to adaptive upgrade identification system 102 to request that the upgrade analysis be performed. This is indicated by block 252. It may be that the manufacturer of the base system deployed by computing system 112 releases a new upgrade. This may trigger the upgrade analysis to be performed, and this is indicated by block 254. System 102 may determine that it is time to perform an upgrade analysis in other ways as well, and this is indicated by block 256.

System 102 then obtains upgrade objectives or upgrade criteria for the deployment under analysis (e.g., the deployment in computing system 112). This is indicated by block 258. The upgrade objectives or upgrade criteria may take a wide variety of different forms. For instance, it may be that the objectives for computing system 112 are to perform an upgrade if it will increase the reliability and decrease warranty costs for a product being manufactured by the organization that uses computing system 112. It may be that the system is to be upgraded if it moves more toward a "lean manufacturing" model or would improve manufacturing efficiency or reduce raw materials waste, etc. All of these, or a wide variety of other criteria can be used as upgrade objectives or upgrade criteria in determining whether an upgrade should be incorporated into the deployment under analysis.

Process modeling component 182 then performs process modeling interrogation with respect to monitoring component 132 in computing system 112. This is indicated by block 260. This can be done ahead of time and stored, or concurrently with the process presently being described. For instance, monitoring component 132 can provide monitor information that is indicative of the various processes 138 that are deployed and used in computing system 112, and the usage patterns (e.g., the way that they are used) by users 118-120. The information can also illustratively include an industry (or industry category) that computing system 112 is deployed in (such as manufacturing, retail, etc.) as well as a locale (such as country, continent, etc.). Component 182 can interrogate component 132, or component 132 can provide that information to component 182 in other ways.

Based upon the received information, process modeling component 182 identifies and models the deployed processes. This is indicated by block 262. This can, for instance, be based on the metadata 148 that defines those processes. During this process, component 132 can also identify the particular customizations made to the base system in the deployment in computing system 112. The customizations may be marked as such or they may be identified by comparing the metadata and code in the deployed system with that of the system manufactured by the manufacturer of the system. Identifying the customizations is indicated by block 264 in the flow diagram of FIG. 2.

Monitoring component 132 can also provide an upgrade history indicative of various other upgrades that have already been made to the deployment in computing system 112. This is indicated by block 266. As mentioned above, the information can also identify the usage patterns of users 118-120. This is indicated by block 268. Identifying and modeling the deployed processes can be done in a wide variety of other ways as well, and this is indicated by block 270.

Once the processes and usage patterns (and, e.g., the customizations and upgrade history) have been modeled by component 182, upgrade identifier logic 194 identifies any upgrades (e.g., updates 158 or upgrades 160) that are available by upgrade publication system 104, to the modeled processes. This is indicated by block 272. It can identify the code and metadata for the modeled processes, as indicated by block 274, and it can compare the upgrades to that code or metadata, as indicated by block 276. It can thus identify the particular processes that are deployed in computing system 112 that will be affected by the available upgrades. It can also identify any industry or locale associated with the available upgrades and compare them to the industry and locale of computing system 112. This is indicated by block 275. For instance, if an available update is only applicable to manufacturing companies in Brazil, then it will not be identified as an applicable upgrade to computer system 112 if system 112 is deployed in a manufacturing company in another country, even though many of the deployed processes will be the same. It can identify upgrades that are available given the deployed processes in other ways as well, and this is indicated by block 277.

Weight generation logic 196 can then generate a weight value for each applicable upgrade. The weight value may illustratively be indicative of how much the particular upgrade will impact the deployed processes. This is indicated by block 278 in FIG. 2. The impact may be indicative of the quantity of changes that the upgrade will make to one or more processes. This is indicated by block 280. The impact value can be provided on an individual process-by-process basis, as indicated by block 282, it can also be given for the deployment, as a whole. This is indicated by block 284. In addition, the impact value may be higher if the usage patterns indicate that an impacted process is heavily used by users 118-120. The impact value can be generated in other ways as well, and this is indicated by block 286.

Performance change estimation component 198 then evaluates the change in conformance of the deployed computing system 112 relative to industry standards or best practices (which can be accessed through information store 106). This is indicated by block 288. For instance, it may be that the upgrades will move the deployment in computing system 112 closer to the industry standards or best practices 164 and 166 in information store 106. Component 198 thus illustratively evaluates the changes in operation of computing system 112, relative to the industry standards and best practices, if the upgrades were to be incorporated.

Performance change estimation component 198 and upgrade effort estimation component 200 then generate estimated performance change metrics and effort metrics corresponding to incorporating the applicable upgrades in the deployed processes in computing system 112. This is indicated by block 290. This is described in greater detail below with respect to FIG. 3. Suffice it to say, for now, that components 198 and 200 access historical information indicative of how the performance metric values changed in similar systems, after the upgrades were incorporated. It also illustratively accesses historical information indicative of the cost or effort used in incorporating those changes into the similar systems. This information is used to generate the performance change metrics and effort metric estimations for system 112.

Recommendation engine 188 then generates an upgrade recommendation for upgrading the deployed processes in system 112. This is indicated by block 292 in FIG. 2. In doing so, recommended upgrade identifier logic 206 can identify the recommended upgrades that will be used in the recommendation. This is indicated by block 294. Sequence identifier logic 208 can generate an upgrade sequence recommendation as indicated by block 296. Recommendation generator logic 210 can then output the recommended upgrades and sequence, along with the performance change estimation metrics and the estimated upgrade effort for consumption. This is indicated by block 298. The recommendation can include a wide variety of other information as well, and this is indicated by block 300.

Recommendation engine 210 can also access project planning system 114 and generate a project plan based upon the upgrade recommendation. This is indicated by block 302. Because the deployed processes and customizations are already known, the project plan can be very specific. It may include a wide variety of different detail. In different examples, it can be a fairly general project plan, or it can be a very detailed project plan which identifies individuals in the organization using computing system 112 that can perform the upgrades, how much time will be attributed to each, the various schedules and resources needed to perform the upgrade, etc.

In one example, upgrade component 191 can also access test upgrade system 176 to perform the recommended upgrades in a test environment. This is indicated by block 304. Once the upgraded system is tested in the test environment, then machine learning system 186 can update itself based on the measured performance change and the effort needed to perform the upgrades, in the test environment. This is indicated by block 306. For instance, it may be that a better estimation of those items can be generated, once the upgrades have been incorporated into the test environment, and tests have been run. The test environment can be provisioned in a wide variety of different ways as well. For instance, it may be based on a user input indicating that the upgrades are to be tested. This is indicated by block 308. It may be automatically provisioned by component 191 as indicated by block 310. Once provisioned, user access is illustratively provided to the test environment so that a designated user can perform any desired testing on the upgrades. This is indicated by block 312. The recommended upgrades can be performed in the test environment in a wide variety of other ways as well, and this is indicated by block 314. Making any modifications to the estimated performance change and effort metrics based on the test results, and incorporating them into a revised recommendation, is indicated by block 316 in FIG. 2.

At some point, a decision maker for computing system 112 may select upgrades for incorporation into the deployed processes (e.g., into the production environment for computing system 112). If this does not happen, then the recommendation and test results may be saved by system 102 for later access. This is indicated by blocks 318 and 320 in FIG. 2.

However, if some upgrades are selected for incorporation, then system 102 illustratively automatically accesses the production upgrade system 178 and invokes it to make the upgrades to the production environment for computing system 112. This is indicated by block 322. By automatically it is meant that the action is performed without any further user input, except perhaps to initiate or authorize the action. It also then illustratively outputs the actual update effort information to the machine learning system indicative of the actual effort needed to incorporate the updates. This is indicated by block 324. This information can be used by component 200 in machine learning system 186 to revise the machine learned algorithm in making those estimates. The upgrades can be made in the production environment for computing system 112 in other ways as well, and this is indicated by block 326.

Monitoring component 132 then monitors and feeds back the project and performance information to update the learning system 186 and information stores 106 and 108. This is indicated by block 328. For instance, monitoring system 132 can generate outputs indicative of the actual performance metric changes that occur in system 112, after the updates are incorporated. This information can be included in the historical information in data stores 106 and 108. It can also be used by performance change estimation component 198 in machine learning system 186 to revise the estimation algorithm.

Figure 3:
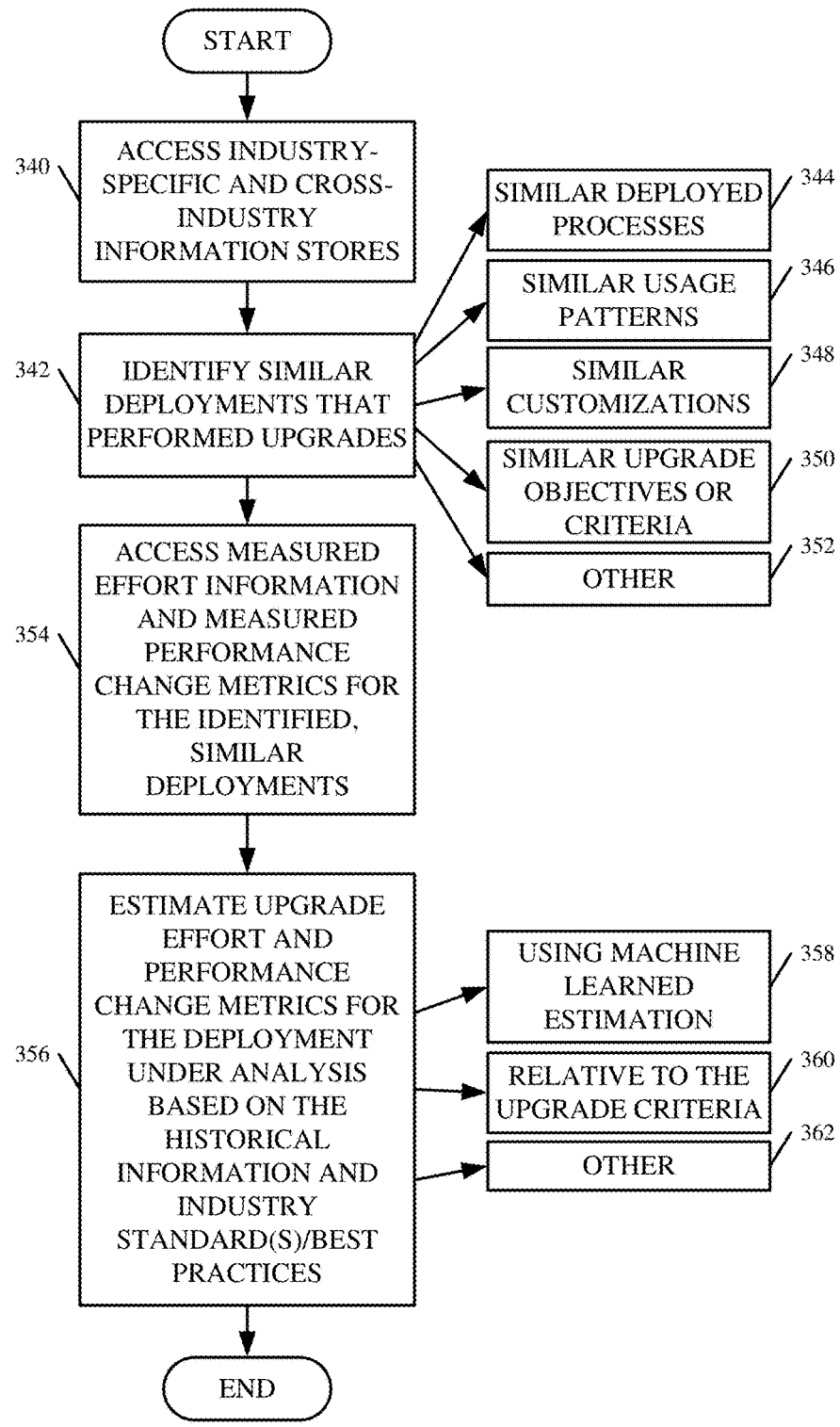
FIG. 3 is a flow diagram illustrating one example of the operation of the architecture shown in FIG. 1 in generating estimated performance change metrics, for the deployed computing system.

FIG. 3 is a flow diagram illustrating one example of how machine learning system 186 generates estimated performance change metrics and effort metrics corresponding to incorporating any applicable upgrades into the deployed processes in computing system 112. Machine learning system 186 first accesses the industry-specific and cross-industry information stores 106 and 108, respectively, to obtain historical information relative to organizations that have incorporated updates. This is indicated by block 340 in FIG. 3.

Performance change estimation component 198 then identifies similar deployments that performed the available updates indicated by system 184. This is indicated by block 342. In one example, component 198 compares the deployed processes in computing system 112 with those in the systems represented by the historical information in data stores 106 and 108. There may be a threshold number of processes that are the same, and that information is then identified as information that signifies similar deployed processes. This is indicated by block 344. Component 198 can also compare the usage patterns identified in the historical information, with those for system 112, to identify historical information associated with deployments that had similar usage patterns.

This is indicated by block 346. It can identify the customizations in the deployments represented in information stores 106 and 108 and compare those to the customizations in the deployed processes in computing system 112 to identify information associated with deployments that had similar customizations. This is indicated by block 348. It can also identify historical information associated with deployments that had similar upgrade objectives or upgrade criteria as the deployment in system 112. This is indicated by block 350. The similar deployments can be identified in a wide variety of other ways as well, and this is indicated by block 352.

Upgrade effort estimation component 200 then accesses the measured upgrade effort information, and performance change estimation component 198 accesses the measured performance change metrics for the identified, similar deployments in data stores 106 and 108. By way of example, components 198 and 200 can access the historical performance measurement and upgrade effort data 168 (and, to the extent relevant, the historical performance measurement and upgrade effort data 172). This is information that was actually measured in the similar deployments and is indicative of the effort needed to incorporate the upgrades and the change in performance metrics once the upgrades are incorporated. This is indicated by block 354 in FIG. 3.

Components 198 and 200 then estimate the upgrade effort and performance change metrics for the deployment under analysis in computing system 112, based upon the historical information. This is indicated by block 356 in FIG. 3. It will be noted that, as discussed above, the industry standards and best practices can be considered as well. Again, this can be done using machine learned estimation algorithms as indicated by block 358. It can also be done relative to the upgrade criteria for system 112. For instance, if one of the upgrade criteria is to move toward "lean manufacturing" techniques, then the performance metric estimation will quantify how far computing system 112 moves in that direction, based upon the upgrades. If the upgrade criteria are to "reduce raw materials waste by 10%", or "increase manufacturing efficiency by 10%", or the like, then the performance change metrics will be evaluated relative to those criteria. Evaluating the change metrics relative to upgrade criteria is indicated by block 360 in FIG. 3. It will be noted that the upgrade effort and performance change metrics can be estimated for the deployment in computing system 112 in a wide variety of other ways as well, and this is indicated by block 362. It can thus be seen that the present description provides a feedback loop by which actual, measured, performance metrics can be used in a machine learning system to generate estimations of measurable outcomes for incorporating upgrades to a computing system. The upgrades can then be selectively incorporated, and the performance metrics can again be measured in the newly upgraded computing system. This information can be fed back to further enhance the machine learning process. Similarly, estimations of upgrade effort can be generated based on actual, measured effort units for previous, similarly situated, deployments that incorporated the upgrades. The actual effort units can be measured for the current computing system as well, and that information can also be fed back to the machine learning system to enhance the machine learning estimation system. The present system thus enhances the accuracy of the computer system itself, and it also greatly enhances the user experience in identifying upgrades, and upgrading a computing system.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
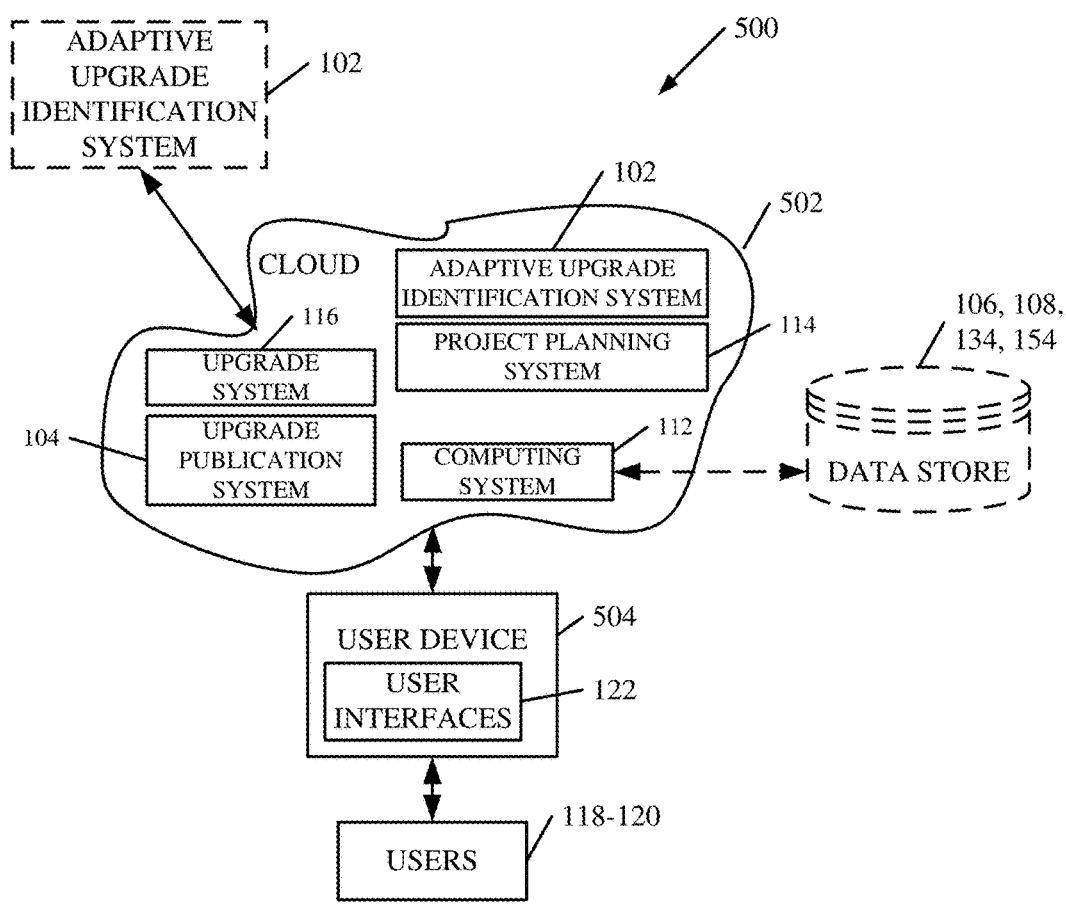
FIG. 4 is a block diagram of one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. For instance, in one cloud computing configuration, one or more hosting machines can have one or more hypervisors that each run a set of virtual machines. The hypervisor(s) can provide the virtual machines with a virtual operating platform and manage execution of the operating system for the virtual machines. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that some of the items in FIG. 1 can be located in cloud 502 (which can be public, private, or a combination where portions are public while others are private). Therefore, users 118-120 use a user device 504 to access those systems through cloud 502.

FIG. 4 also depicts another example of a cloud architecture. FIG. 4 shows that it is also contemplated that some elements of architecture 100 can be disposed in cloud 502 while others are not. By way of example, data stores 106, 108, 134 and 154 can be disposed outside of cloud 502, and accessed through cloud 502. In another example, adaptive upgrade identification system 102 (or other systems) can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
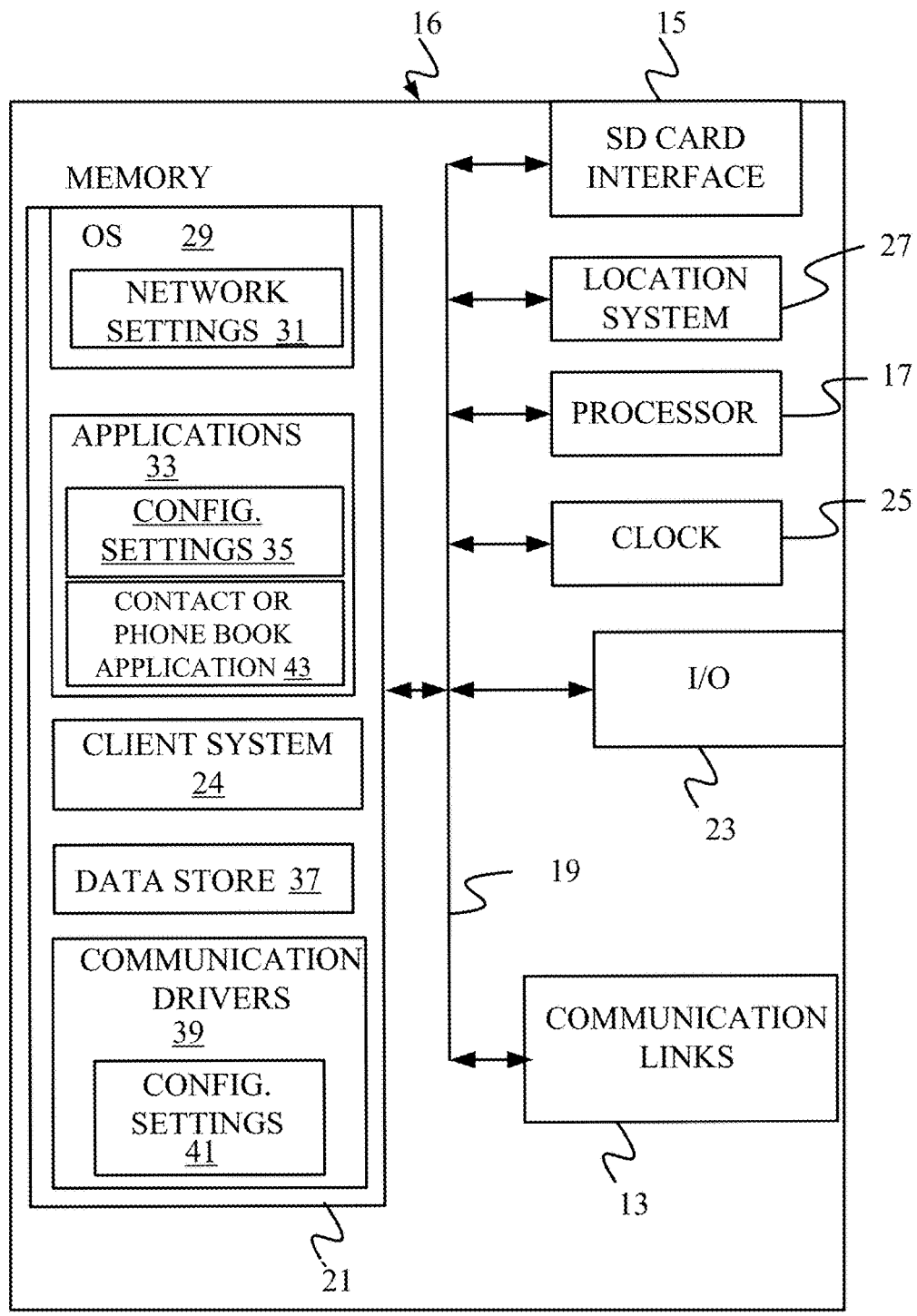
FIGS. 5-7 show examples of mobile devices that can be used in the architectures shown in the previous figures.
Figure 6:
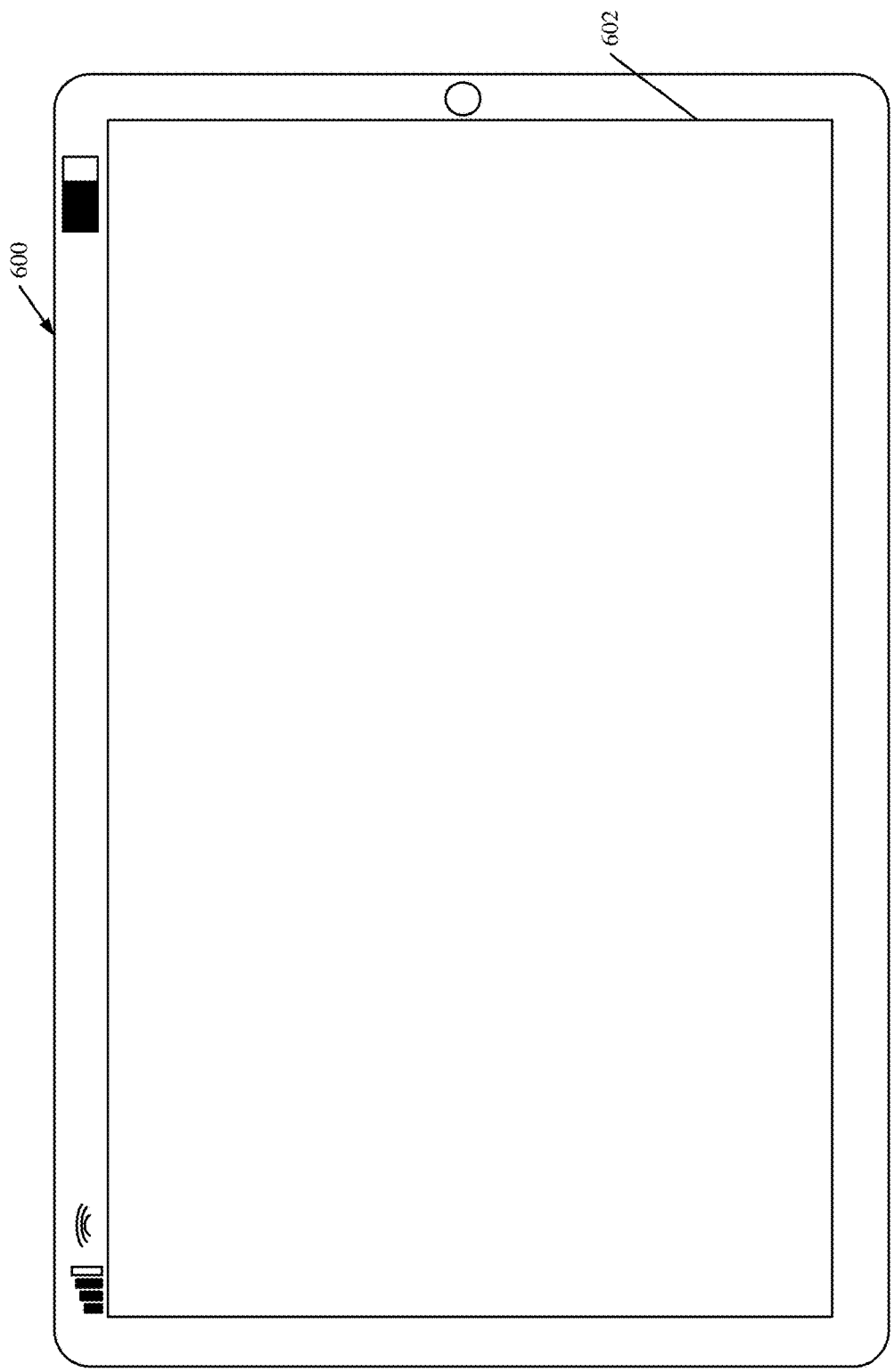
Figure 7:
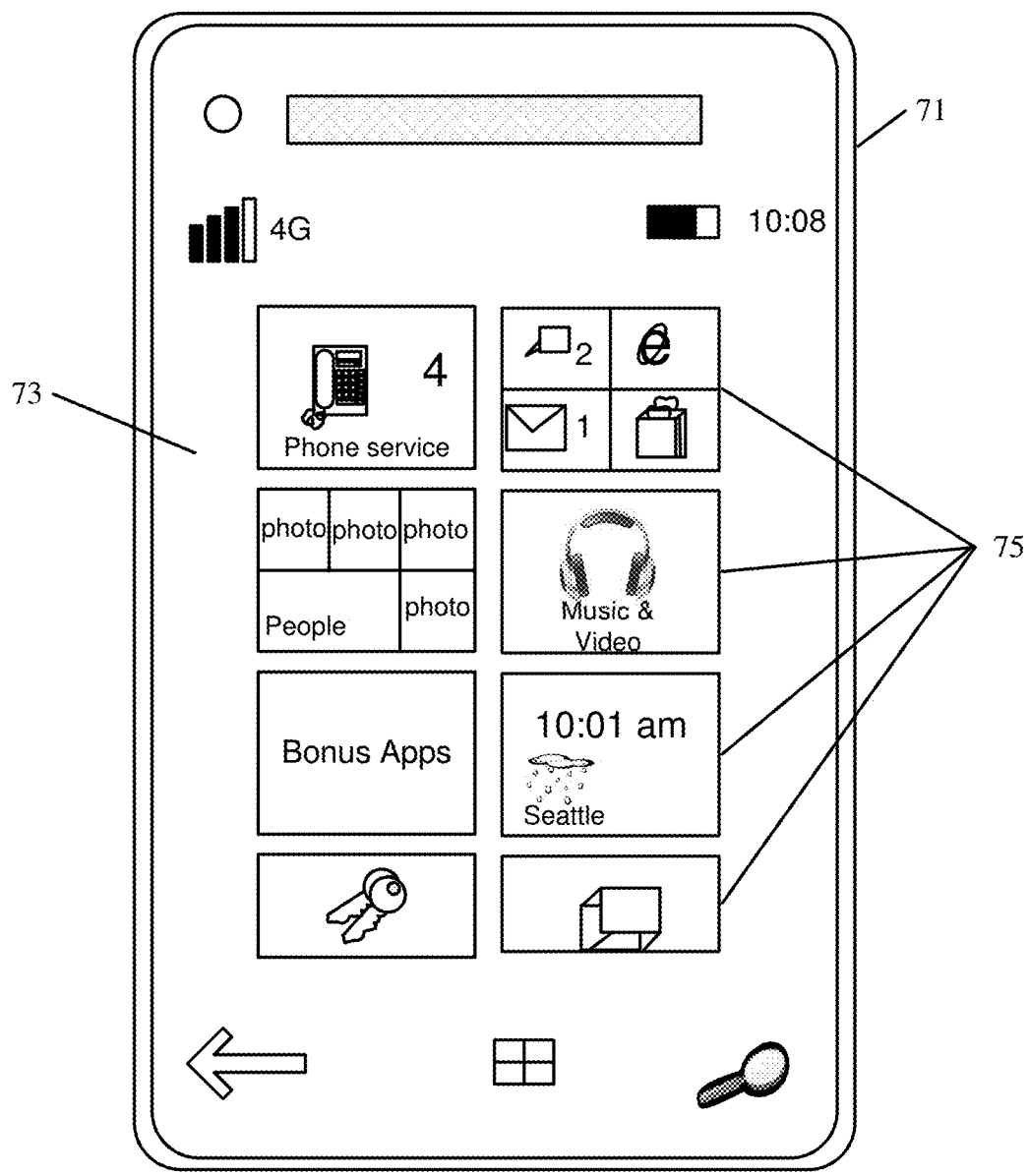

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components of architecture 100 or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
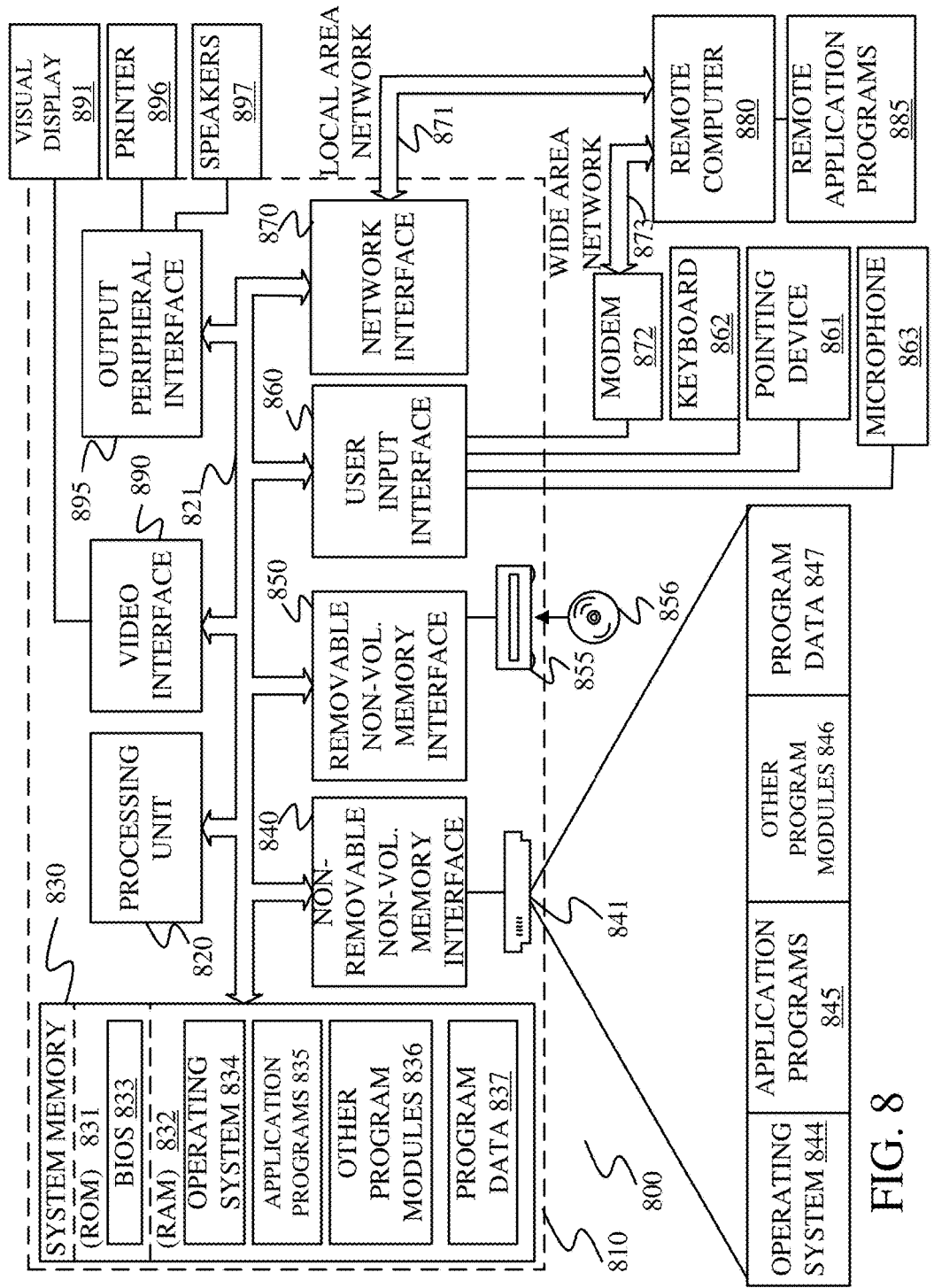
FIG. 8 is a block diagram of one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise one or more processors from FIG. 1), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a process modeling component configured to identify a set of deployed processes on a computing system under analysis;

an applicable upgrade identification system configured to identify an applicable upgrade available to the computing system under analysis, based on the identified set of deployed processes;

a machine learning system configured to access a measured performance metric corresponding to another computing system that incorporated the applicable upgrade and to generate a performance change metric indicative of an estimated change in a performance metric for the computing system under analysis, based on incorporation of the applicable upgrade into the computing system under analysis; and a recommendation engine that generates an upgrade recommendation that includes the applicable upgrade and the performance change metric.

Example 2 is the computing system of any or all previous examples wherein the applicable upgrade identification system comprises:

upgrade identifier logic that identifies, as applicable upgrades, available upgrades to the deployed processes in the set of deployed processes.

Example 3 is the computing system of any or all previous examples wherein the applicable upgrade identification system comprises:

weight generation logic that generates an impact weight indicative of an impact of each of the applicable upgrades on the deployed processes.

Example 4 is the computing system of any or all previous examples wherein the process modeling component is further configured to identify usage patterns corresponding to the set of deployed processes indicative of usage of the set of deployed processes in the computing system under analysis, the weight generation logic generating the impact weight as having more impact if a given available upgrade affects a deployed process that is heavily used in the computing system under analysis, based on the identified usage patterns.

Example 5 is the computing system of any or all previous examples wherein the machine learning system comprises:

an upgrade effort estimation component configured to access a measured effort metric corresponding to another computing system that incorporated the applicable upgrade, the measured effort metric being indicative of effort used in incorporating the applicable upgrade into the other computing system, and to generate an upgrade effort metric indicative of an estimated, measurable effort for incorporating the applicable upgrade into the computing system under analysis.

Example 6 is the computing system of any or all previous examples wherein the recommendation engine comprises:

recommended upgrade identifier logic that compares the upgrade effort metric to the performance change metric to identify a recommended upgrade to be included in the upgrade recommendation.

Example 7 is the computing system of any or all previous examples wherein the machine learning system is configured to obtain an upgrade criterion and generate the performance change metric relative to the upgrade criterion.

Example 8 is the computing system of any or all previous examples wherein the process modeling component is configured to identify customizations to the deployed processes in the set of deployed processes in the computing system under analysis.

Example 9 is the computing system of any or all previous examples wherein the machine learning system Is configured to identify, as the other computing system, a similar computing system that is similar to the computing system under analysis based on the set of deployed processes in the computing system under analysis and the other computing system, the usage patterns in the computing system under analysis and the other computing system, the customizations to the set of deployed processes in the computing system under analysis and the other computing system, and the upgrade criterion for the computing system under analysis and the other computing system.

Example 10 is the computing system of any or all previous examples wherein the recommendation engine comprises:

sequence identifier logic configured to, when the upgrade recommendation identifies a plurality of recommended upgrades, identify a recommended upgrade sequence for incorporating the plurality of recommended upgrades into the computing system under analysis.

Example 11 is the computing system of any or all previous examples and further comprising:

an upgrade component configured to access an upgrade system and automatically provision a test environment and deploy the recommended upgrades into the test environment and to measure the performance change metric based on incorporation of the recommended upgrades to the computing system under analysis in the test environment, the recommendation engine updating the recommendation, based on the measured performance change metric, measured in the test environment.

Example 12 is the computing system of any or all previous examples wherein the upgrade component is further configured to access the upgrade system and perform the recommended upgrades in a production environment for the computing system under analysis, measure the effort metric corresponding to performing the recommended upgrades in the production environment and to measure the change in the performance metric based on performing the recommended upgrades in the production environment, and feed the measured effort metric corresponding to performing the recommended upgrades in the production environment and the measured change in the performance metric, back to the machine learning system.

Example 13 is a computer implemented method, comprising:

identifying a set of deployed processes on a computing system under analysis;

comparing the set of deployed processes to available upgrades to identify an applicable upgrade available to the computing system under analysis;

obtaining a measured performance metric corresponding to another computing system that incorporated the applicable upgrade;

generating a performance change metric indicative of an estimated change in a performance metric for the computing system under analysis, corresponding to incorporation of the applicable upgrade into the computing system under analysis, based on the measured performance metric obtained for the other computing system; and a recommendation engine that generates an upgrade recommendation that includes the applicable upgrade and the performance change metric.

Example 14 is the computer implemented method of any or all previous examples and further comprising:

generating an impact weight indicative of an impact of the applicable upgrade on the deployed processes.

Example 15 is the computer implemented method of any or all previous examples wherein identifying a set of deployed processes further comprises:

identifying usage patterns corresponding to the set of deployed processes indicative of usage of the set of deployed processes in the computing system under analysis, wherein generating an impact weight comprises generating the impact weight as having more impact if a given available upgrade affects a deployed process that is heavily used in the computing system under analysis, based on the identified usage patterns.

Example 16 is the computer implemented method of any or all previous examples and further comprising:

obtaining a measured effort metric corresponding to the other computing system that incorporated the applicable upgrade, the measured effort metric being indicative of effort used in incorporating the applicable upgrade into the other computing system; and generating an upgrade effort metric indicative of an estimated, measurable effort for incorporating the applicable upgrade into the computing system under analysis.

Example 17 is the computer implemented method of any or all previous examples wherein identifying a set of deployed processes comprises:

identifying customizations to the deployed processes in the set of deployed processes in the computing system under analysis.

Example 18 is the computer implemented method of any or all previous examples wherein obtaining a measured performance metric comprises:

identifying, as the other computing system, a similar computing system that is similar to the computing system under analysis based on the set of deployed processes in the computing system under analysis and the other computing system, the usage patterns in the computing system under analysis and the other computing system, and the customizations to the set of deployed processes in the computing system under analysis and the other computing system.

Example 19 is a computing system, comprising:

a process modeling component configured to identify a set of deployed processes on a computing system under analysis, usage patterns corresponding to the set of deployed processes, indicative of usage of the set of deployed processes in the computing system under analysis, and customizations to the deployed processes in the set of deployed processes in the computing system under analysis;

an applicable upgrade identification system configured to identify an applicable upgrade available to the computing system under analysis, based on the identified set of deployed processes;

a machine learning system configured to access a measured performance metric and a measured effort metric corresponding to another computing system that incorporated the applicable upgrade and to generate a performance change metric indicative of an estimated change in a performance metric for the computing system under analysis, based the measured performance metric, and to generate an upgrade effort metric indicative of an estimated, measurable effort for incorporating the applicable upgrade into the computing system under analysis, based on the measured effort metric; and a recommendation engine that generates an upgrade recommendation that includes the applicable upgrade and the performance change metric.

Example 20 is the computing system of any or all previous examples wherein the machine learning system is configured to identify, as the other computing system, a similar computing system that is similar to the computing system under analysis based on the set of deployed processes in the computing system under analysis and the other computing system, the usage patterns in the computing system under analysis and the other computing system, and the customizations to the set of deployed processes in the computing system under analysis and the other computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   a process modeling component configured to:
      identify a computing process deployed on a target computing system;
   an applicable upgrade identification system configured to:
      based on the computing process, identify an upgrade applicable to the target computing system;
   a machine learning system configured to:
      identify another computing system as being similar to the target computing system based on
         identification of the computing process deployed in the other computing system, and
         a usage pattern indicative of usage of the computing process in the target computing system relative to a usage pattern indicative of usage of the computing process in the other computing system; and
      receive a measured performance metric corresponding to the other computing system configured with the upgrade; and
      based on the measured performance metric corresponding to the other computing system, generate a performance change metric indicative of an estimated change in a performance metric for the target computing system corresponding to incorporation of the upgrade into the target computing system; and
   an upgrade system configured to:
      select the upgrade based on the performance change metric; and
      apply the upgrade to the target computing system.

2. The computing system of claim 1 wherein the update system is configured to:
   measure the change in the performance metric based on the application of the upgrade; and
   update the machine learning system based on the measured change in the performance metric.

3. The computing system of claim 1 wherein the applicable upgrade identification system comprises:
   upgrade identifier logic configured to identify, as applicable upgrades, available upgrades to the deployed processes in the set of deployed ,processes; and
   weight generation logic configured to generate an impact weight indicative of an impact of each of the applicable upgrades on the deployed processes.

4. The computing system of claim 3 wherein the process modeling component is further configured to:
   identify usage patterns corresponding to the set of deployed processes indicative of usage of the set of deployed processes in the target computing system, the weight generation logic configured to generate the impact weight as having more impact if a given available upgrade affects a deployed process that is heavily used in the target computing system based on the identified usage patterns.

5. The computing system of claim 4 wherein the machine learning system comprises:
   an upgrade effort estimation component configured to:
      access a measured effort metric corresponding to the other computing system, the measured effort metric being indicative of effort used in configuring the other computing system with the applicable upgrade, and based on the measured effort metric, generate an upgrade effort metric indicative of an estimated, measurable effort for configuring the target computing system with the applicable upgrade.

6. The computing system of claim 5 wherein the recommendation engine comprises:
recommended upgrade identifier logic configured to compare the upgrade effort metric to the performance change metric to identify a recommended upgrade to be included in the upgrade recommendation.

7. The computing system of claim 1 wherein the machine learning system is configured to:
obtain an upgrade criterion associated with the target computing system; and
generate the performance change metric relative to the upgrade criterion.

8. The computing system of claim 7 wherein the process modeling component is configured to identify a customization to the identified computing process in the target computing system.

9. The computing system of claim 8 wherein the machine learning system is configured to identify the other computing system based on
identification of the customization to the computing process in the other computing system, and
the upgrade criterion for the target computing system relative to an upgrade criterion associated with the other computing system.

10. The computing system of claim 9 wherein the recommendation engine comprises:
sequence identifier logic configured to:
based on a determination that the upgrade recommendation identifies a plurality of recommended upgrades, identify a recommended upgrade sequence for configuring the target computing system with the plurality of recommended upgrades.

11. The computing system of claim 10 and further comprising:
an upgrade component configured to:
automatically provision a test environment deploy the recommended upgrades into the test environment; and measure the performance change metric based on configuring the target computing system with the recommended upgrades in the test environment,
the recommendation engine being configured to update the recommendation, based on the measured performance change metric, measured in the test environment.

12. The computing system of claim 11 wherein the upgrade component is further configured to:
perform the recommended upgrades in a production environment corresponding to the target computing system;
measure the effort metric corresponding to performing the recommended upgrades in the production environment;
measure the change in the performance metric based on performing the recommended upgrades in the production environment; and
provide, to the machine learning system, the measured effort metric corresponding to performing the recommended upgrades in the production environment and the measured change in the performance metric.

13. A computer implemented method, comprising:
identifying a computing process deployed on a target computing system;
based on the computing process, identifying an upgrade that is applicable to the target computing system;
identifying another computing system as being similar to the target computing system based on
identification of the computing process deployed in other computing system, and
a usage pattern indicative of usage of the computing process in the target computing system relative to a usage pattern indicative of usage of the computing process in the other computing system; and
receiving a measured performance metric corresponding to the other computing system configured with the upgrade;
based on the measured performance metric corresponding to the other computing system, generating a performance change metric indicative of an estimated change in a performance metric for the target computing system corresponding to incorporation of the upgrade into the target computing system;
selecting the upgrade based on the performance change metric; and
applying the upgrade to the target computing system.

14. The computer implemented method of claim 13 and further comprising:
generating an impact weight indicative of an impact of the upgrade on the deployed computing process.

15. The computer implemented method of claim 14 wherein generating an impact weight comprises:
generating the impact weight as having more impact if the upgrade affects a deployed computing process that is heavily used in the target computing system based on the usage pattern.

16. The computer implemented method of claim 15 and further comprising:
obtaining a measured effort metric corresponding to the other computing system, the measured effort metric being indicative of effort used in configuring the other computing system with the applicable upgrade; and
generating an upgrade effort metric indicative of an estimated, measurable effort for incorporating the applicable upgrade into the target computing system.

17. The computer implemented method of claim 16 wherein identifying a computing process comprises:
identifying a customization to the computing process in the target computing system.

18. The computer implemented method of claim 17 wherein the other computing system is identified as similar to the target computing system based on
identification of the customization to the computing process in the other computing system.

19. A computing system, comprising:
a process modeling component configured to:
identify a computing process deployed on a target computing system;
identify a usage pattern corresponding to the computing process indicative of usage of the computing process in the target computing system; and
identify a customization to the computing process in the target computing system;
an applicable upgrade identification system configured to:
based on the computing process, identify an upgrade applicable to the target computing system;
a machine learning system configured to:
identify another computing system as being similar to the target computing system based on
identification of the computing process deployed in other computing system, and a usage pattern indicative of usage of the computing process in the target computing system relative to a usage pattern indicative of usage of the computing process in the other computing system; and receive a measured performance metric corresponding to the other computing system configured with the upgrade; and based on the measured performance metric correspond the other computing system, generate a performance charge metric indicative of an estimated change in a performance metric for the target computing system corresponding to incorporation of the upgrade into the target computing system; and an upgrade system configured to:
  select the upgrade based on the performance change metric:
  apply the upgrade to the target computing system;
  measure the change in the performance metric based on the application of the upgrade to the target computing system; and
  update the machine learning system based on the measured change in the performance metric.

20. The computing system of claim 19 wherein the machine learning system is configured to identify the other computing system based on
  identification of the customization to the computing process in the other computing system.

* * * * *